(12) United States Patent
Lee et al.

(10) Patent No.: US 10,465,066 B2
(45) Date of Patent: Nov. 5, 2019

(54) POLYPROPYLENE COMPOSITE RESIN COMPOSITION WITH CONTINUOUSLY MAINTAINED DEODORIZING CAPABILITY AND AROMATICITY

(71) Applicants: Hyundai Motor Company, Seoul (KR); Kia Motors Corporation, Seoul (KR); GS CALTEX, Seoul (KR)

(72) Inventors: Han Ki Lee, Seoul (KR); Mun Gyu Bak, Seoul (KR); Cheol Hee Park, Daejeon (KR); Seung Hyun Lee, Daejeon (KR); Jae Min Kim, Daejeon (KR)

(73) Assignees: Hyundai Motor Company, Seoul (KR); Kia Motors Corporation, Seoul (KR); GS Caltex, Seoul (KR)

( * ) Notice: Subject to any disclaimer, the term of this patent is extended or adjusted under 35 U.S.C. 154(b) by 167 days.

(21) Appl. No.: 15/814,079

(22) Filed: Nov. 15, 2017

(65) Prior Publication Data

US 2018/0163036 A1     Jun. 14, 2018

(30) Foreign Application Priority Data

Dec. 8, 2016  (KR) ........................ 10-2016-0166782

(51) Int. Cl.
| | |
|---|---|
| *C08L 23/10* | (2006.01) |
| *C08K 5/01* | (2006.01) |
| *C08L 23/12* | (2006.01) |
| *C08L 21/00* | (2006.01) |
| *C08K 11/00* | (2006.01) |
| *C08K 5/00* | (2006.01) |
| *C08K 3/36* | (2006.01) |
| *C08K 3/34* | (2006.01) |
| *C08F 10/06* | (2006.01) |
| *C08J 3/22* | (2006.01) |
| *C08K 7/00* | (2006.01) |
| *C08K 7/24* | (2006.01) |
| *C08K 9/06* | (2006.01) |
| *C08K 9/10* | (2006.01) |
| *C08L 91/06* | (2006.01) |

(52) U.S. Cl.
CPC .............. *C08L 23/12* (2013.01); *C08F 10/06* (2013.01); *C08J 3/22* (2013.01); *C08K 3/34* (2013.01); *C08K 3/346* (2013.01); *C08K 3/36* (2013.01); *C08K 5/00* (2013.01); *C08K 5/0058* (2013.01); *C08K 5/01* (2013.01); *C08K 7/00* (2013.01); *C08K 7/24* (2013.01); *C08K 9/06* (2013.01); *C08K 9/10* (2013.01); *C08K 11/00* (2013.01); *C08L 21/00* (2013.01); *C08L 91/06* (2013.01); *C08F 2500/12* (2013.01); *C08J 2300/22* (2013.01); *C08J 2323/12* (2013.01); *C08J 2423/16* (2013.01); *C08K 2201/007* (2013.01); *C08L 2207/322* (2013.01); *C08L 2310/00* (2013.01)

(58) Field of Classification Search
CPC .......... C08K 5/01; C08F 10/06; C08F 110/06; C08F 210/06; C08L 23/10; C08L 23/12; C08L 23/14; C08L 23/142; C08L 23/145; C08L 23/147
See application file for complete search history.

(56) References Cited

FOREIGN PATENT DOCUMENTS

| KR | 100799262 B1 * | 1/2008 |
|---|---|---|
| KR | 10-2008-0073555 A | 8/2008 |
| KR | 10-2010-0077905 A | 7/2010 |
| KR | 20100077905 A * | 7/2010 |
| KR | 10-1202705 B1 | 11/2012 |
| KR | 101202705 B1 * | 11/2012 |
| KR | 10-2013-0136628 A | 12/2013 |
| KR | 20130136628 A * | 12/2013 |
| KR | 10-1490103 B1 | 3/2015 |

OTHER PUBLICATIONS

H. Yazdani, J. Morshedian, H. A. Khonakdar. Polymer Composites 2006, 27(5), 491-496. "Effects of silane coupling agent and maleic anhydride-grafted polypropylene on the morphology and viscoelastic properties of polypropylene-mica composites". (Year: 2006).*

* cited by examiner

*Primary Examiner* — Richard A Huhn
(74) *Attorney, Agent, or Firm* — Morgan, Lewis & Bockius LLP (SF)

(57) ABSTRACT

A polypropylene composite resin composition and an automotive interior part molded using the polypropylene composite resin composition are provided herein. The polypropylene composite resin composition contains: (a) an easily injection moldable polypropylene polymer, (b) a thermoplastic elastomer for improving impact resistance, (c) a platy inorganic filler surface-treated with an organosilane having affinity for a phytoncide, (d) a phytoncide having deodorizing capability and aromaticity, (e) a processing oil preventing pyrolysis of the phytoncide, and (f) a surfactant for improving the compatibility between the base resin and the phytoncide at specific compositional ratios. The automotive interior part molded using the polypropylene composite resin composition disclosed herein provides a pleasant environment for drivers by removing the offensive odor from volatile organic compounds (VOCs), etc. and maintaining the intrinsic scent of the phytoncide for a long time.

12 Claims, No Drawings

POLYPROPYLENE COMPOSITE RESIN COMPOSITION WITH CONTINUOUSLY MAINTAINED DEODORIZING CAPABILITY AND AROMATICITY

CROSS-REFERENCE TO RELATED APPLICATIONS

The present application claims under 35 U.S.C. § 119(a) the benefit of Korean Patent Application No. 10-2016-0166782, filed on Dec. 8, 2016, the disclosure of which is incorporated herein by reference in its entirety.

BACKGROUND

Technical Field

The present invention relates to a polypropylene composite resin composition, which has mechanical properties sufficient to be used for automotive interior parts and has continuously maintained deodorizing capability and aromaticity.

Background Art

Articles molded from polymer materials have their own offensive odor which also causes a quality problem. A large quantity of pollutants like volatile organic compounds (VOCs) such as benzene, formaldehyde, toluene, xylene, acetaldehyde, etc. are emitted from the interior parts of newly purchased automobiles. The volatile organic compounds (VOCs) cause an offensive odor even at low concentrations and are also harmful to the environment and human body, causing leukemia, chromosome aberration, central nervous system disorder, etc. In particular, for the interior parts that are used inside automobiles isolated from outside, the damage by the volatile organic compounds (VOCs) emitted therefrom is very severe.

Filters are used in automobiles to reduce the damage by the volatile organic compounds (VOCs). For example, filters using oak charcoal, activated carbon, adsorbent nanoparticles, etc. are used to collect the various volatile organic compounds (VOCs) from the inside of the automobiles. However, it is troublesome to additionally install the expensive filter and the offensive odor problem may be worsened if the filter is not replaced at a proper time.

As another method of reducing the damage by the volatile organic compounds (VOCs), a method of adding various deodorants or aromatics such as phytoncides to the polymer materials is known. However, while the polymer material is melted at high temperature and molded into a desired shape, the deodorants or aromatics or their functions are lost through evaporation, pyrolysis, etc. To solve these problems, a method of embedding a deodorant or an aromatic in a resin pellet through encapsulation or a method of preparing a pellet by impregnating a deodorant or an aromatic in a resin and then preparing a masterbatch by coating a coating material for thermal protection on the outer surface of the pellet is known. However, there still remains the evaporation or pyrolysis problem of the deodorant or aromatic during molding. In addition, the water-soluble phytoncide solution worsens physical properties during the molding process.

SUMMARY

The inventors of the present invention have discovered a novel polypropylene composite resin composition. The resin composition can have characteristics such as continuously maintained deodorized capability and aromaticity. The resin composition can be produced by mixing an easily injection moldable polypropylene polymer with an olefin-based thermoplastic elastomer, a phytoncide which serves as a deodorant and aromatic, an inorganic filler that has been surface-modified with a component having affinity for the phytoncide, a processing oil for preventing pyrolysis of the phytoncide, and a surfactant for improving compatibility. The phytoncide can be prevented from being evaporated or pyrolyzed during molding at high temperature and can be retained for a long time in a composite resin without easily moving to the surface. In particular, the inventors have found out that this effect can be maximized by including additives with the phytoncide, except the polypropylene polymer and the olefin-based thermoplastic elastomer, in the form of a masterbatch.

Accordingly, the present invention is directed to providing a polypropylene composite resin composition with continuously maintained deodorizing capability and aromaticity, wherein a phytoncide used as a deodorant and aromatic is not evaporated or pyrolyzed during molding at high temperature but is retained for a long time in the composite resin without easily moving to the surface.

The present invention is also directed to providing an automotive interior part molded using the polypropylene composite resin composition.

In an aspect, the present invention provides a polypropylene composite resin composition with continuously maintained deodorizing capability and aromaticity, which contains:

(a) 40-90 parts by weight of a polypropylene polymer;
(b) 5-25 parts by weight of an olefin-based thermoplastic elastomer;
(c) 5-25 parts by weight of a platy inorganic filler;
(d) 0.1-5 parts by weight of a phytoncide;
(e) 0.1-3 parts by weight of a processing oil; and
(f) 0.1-3 parts by weight of a surfactant, wherein the platy inorganic filler (c), the phytoncide (d), the processing oil (e) and the surfactant (f) are included in the form of a masterbatch.

The polypropylene composite resin composition according to the present invention continuously maintains deodorizing capability and aromaticity for a long period of time and can satisfy the mechanical properties required for automotive interior parts.

An automotive interior part molded from the polypropylene composite resin composition according to the present invention provides a pleasant environment for drivers by removing the offensive odor from volatile organic compounds (VOCs), etc. and maintaining the intrinsic scent of the phytoncide.

DETAILED DESCRIPTION

Hereinafter, exemplary embodiments of the present invention are described in detail.

The present invention relates to a polypropylene composite resin composition, which contains a phytoncide as a deodorant and aromatic in the composition. The polypropylene composite resin composition contains an easily injection-moldable polypropylene polymer and an olefin-based thermoplastic elastomer and further contains a specific additive for continuously maintaining the deodorizing capability and aromaticity of the phytoncide. Also, an automotive interior part can be molded using the polypropylene composite resin composition.

Specifically, the polypropylene composite resin composition according to the present invention contains: (a) about 40-90 parts by weight (e.g., about 40, 45, 50, 55, 60, 65, 70, 75, 80, 85, or about 90 parts by weight) of a polypropylene polymer; (b) about 5-25 parts by weight (e.g., about 5, 10, 15, 20, or about 25 parts by weight) of an olefin-based thermoplastic elastomer; (c) about 5-25 parts by weight (e.g., about 5, 10, 15, 20, or about 25 parts by weight) of a platy inorganic filler; (d) 0.1-5 parts by weight of a phytoncide; (e) about 0.1-3 parts by weight (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or about 3 parts by weight) of a processing oil; and (f) about 0.1-3 parts by weight (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or about 3 parts by weight) of a surfactant.

The deodorizing capability and aromaticity of the phytoncide can be maintained for a long time when the inorganic filler having a platy structure (c), the phytoncide (d), the processing oil (e) and the surfactant (f) are included in the form of a masterbatch.

Hereinafter, the components of the polypropylene composite resin composition according to the present invention are described in more detail.

Polypropylene Polymer

The composite resin composition of the present invention contains a polypropylene polymer as a base resin. The polypropylene polymer (a) may have a melt flow index (MFI) of 5-50 g/10 min (@ 230° C., 2.16 kg), moldability may be unsatisfactory due to decreased flowability. And, when it exceeds 50 g/10 min (@ 230° C., 2.16 kg), Izod and surface impact strength may decrease.

The composite resin composition of the present invention may contain about 40-90 parts by weight (e.g., about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90 parts by weight) of the polypropylene polymer. When the content of the polypropylene polymer is less than 40 parts by weight, the rigidity of the composite resin composition may decrease. And, when it exceeds 90 parts by weight, the coefficient of friction may decrease and, at the same time, the Izod and surface impact strength may decrease. It is very important to use the polypropylene polymer within the above range because the composite resin composition of the present invention plays a critical role in adjusting the overall balance of physical properties.

(b) Olefin-Based Thermoplastic Elastomer

The olefin-based thermoplastic elastomer may be one or more selected from a group consisting of an olefin homopolymer rubber, an olefin copolymer rubber, and an olefin block copolymer rubber. For example, the olefin homopolymer rubber may be ethylene rubber, propylene rubber, butylene rubber, etc. or a mixture thereof as a homopolymer rubber polymerized from a single olefin monomer. For example, the olefin copolymer rubber may be ethylene-butylene rubber, ethylene-octene rubber, etc. or a mixture thereof as a copolymer rubber copolymerized from two or more olefin monomers. The olefin block copolymer rubber is a rubber prepared from block copolymerization of an olefin copolymer rubber such as ethylene-butylene rubber, ethylene-octene rubber, etc. In some embodiments, a copolymer rubber such as ethylene-butylene rubber, ethylene-octene rubber, a mixture thereof, etc. may be used as the olefin-based thermoplastic elastomer.

The composite resin composition of the present invention may contain about 5-25 parts by weight (e.g., about 5, 6, 7, 8, 9, 10, 11, 12, 13, 14, 15, 16, 17, 18, 19, 20, 21, 22, 23, 24, or about 25 parts by weight) of the olefin-based thermoplastic elastomer. When the content of the olefin-based thermoplastic elastomer is less than 5 parts by weight, the Izod and surface impact strength of the composite resin composition may decrease. And, when it exceeds 25 parts by weight, the coefficient of friction may decrease and, at the same time, the Izod and surface impact strength may decrease.

(c) Platy Inorganic Filler

The composite resin composition of the present invention contains a platy inorganic filler as an inorganic filler. The platy inorganic filler may be one or more selected from a group consisting of talc, mica, platy magnesium (Mg), etc. More specifically, a platy inorganic filler having a lamellarity index of 5-15 (e.g., 5, 6, 7, 8, 9, 10, 11, 12, 13, 14 or 15) may be used. The lamellarity index is a measure of how well the platy structure of an inorganic filler is constructed. The index value is larger as the cross-sectional area of the inorganic filler is larger in comparison with its thickness. In general, the lamellarity index of the inorganic filler is below 3. The effect of reinforcing physical properties is superior as the lamellarity index is higher. In addition, when observed with an electron microscope, an inorganic filler having a high lamellarity index exhibits surface roughness in micrometer scale, thereby increasing the coefficient of friction, because the inorganic filler is located on the surface of the composite resin composition. Therefore, an inorganic filler having a lamellarity index of 5-15 is used in the present invention. When the inorganic filler used in the present invention has a lamellarity index below 5, the mechanical properties may be unsatisfactory because the improvement in physical properties is insignificant. And, when it exceeds 15, molding processing of the composite resin composition may be not easy.

Specifically, the platy inorganic filler included in the composite resin composition of the present invention may be surface-treated with an organosilane on which an organic functional group having affinity for the phytoncide is bound. Specifically, the organic functional group having affinity for the phytoncide may be a hydrolyzable organic functional group selected from a group consisting of an epoxide group, an isocyanate group, an organic acid group, an acrylic acid group, an alcohol group, an alkoxy group, and an acyl chloride group. The platy inorganic filler surface-treated with the organosilane, which is included in the composite resin composition of the present invention, can be uniformly dispersed in the organic resin and, in particular, can induce uniform dispersion of the phytoncide because it has good affinity for the phytoncide. More specifically, a platy inorganic filler surface-treated with an alkoxysilane substituted with a $C_1$-$C_4$ alkoxy group may be used in terms of affinity for the phytoncide.

The composite resin composition of the present invention may contain about 5-25 parts by weight (e.g., about 5, 6, 7, 8, 9, 10, 11, 12, 13, 14, 15, 16, 17, 18, 19, 20, 21, 22, 23, 24, or about 25 parts by weight) of the platy inorganic filler surface-treated with the organosilane. When the content of the platy inorganic filler surface-treated with the organosilane is less than 5 parts by weight or exceeds 25 parts by weight, the Izod and surface impact strength of the composite resin composition may be unsatisfactory.

(d) Phytoncide

Phytoncide is a compound word of "phyton" meaning plant and "cide" meaning killing (sterilizing power). That is to say, the term "phytoncide" refers to all the substances having sterilizing ability derived from plants. An exemplary phytoncide has sterilizing ability, air purifying ability of removing hazardous gases such as nitrogen oxide, etc., ability of removing offensive odor, ability of improving body coordination by activating the cerebral cortex and ability of inducing sound sleep. In addition, the phytoncide is known to have many activities beneficial for the human body, including stabilization of the autonomic nerve, improvement of liver function, suppression of the proliferation of bacteria such as Staphylococcus, Salmonella, etc. and molds, anti-allergic action, etc.

The phytoncide contains phenol compounds including terpene, alkaloids, glycosides, etc. as active ingredients. Specifically, the phytoncide may contain one or more selected from a group consisting of α-pinene, β-pinene, camphene, α-terpinene, β-terpinene, γ-terpinene, β-phellandrene, 1,8-cineole, α-terpinolene, and δ-cadinene as an active ingredient.

The composite resin composition of the present invention may contain about 0.1-5 parts by weight (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or about 5 parts by weight) of the phytoncide. When the content of the phytoncide is less than 0.1 part by weight, it is difficult to expect the effect achieved from the addition of the phytoncide. And, when it exceeds 5 parts by weight, the mechanical properties of the composite resin composition may be unsatisfactory.

(e) Processing Oil

The composite resin composition of the present invention contains a processing oil for preventing pyrolysis of the phytoncide. The processing oil may be one or more selected from a group consisting of an aromatic oil, naphthenic oil and a paraffinic oil.

The composite resin composition of the present invention may contain about 0.1-3 parts by weight (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or about 3 parts by weight) of the processing oil. When the content of the processing oil is less than 0.1 part by weight, it is difficult to expect the effect of preventing the pyrolysis of the phytoncide. And, when it exceeds 3 parts by weight, the mechanical properties of the composite resin composition may be unsatisfactory.

(f) Surfactant

The composite resin composition of the present invention contains a surfactant for improving compatibility between the polypropylene polymer and the phytoncide. The surfactant may be a propylene polymer grafted with 3-10 wt % of a silane-based functional group. That is to say, in the present invention, a propylene polymer grafted with a silane-based functional group is used to enhance the compatibility between the polypropylene polymer used as a base resin and the phytoncide used as a deodorant and aromatic. When the degree of grafting of the silane-based functional group bonded to the polypropylene polymer used as a compatibilizer is less than 3 wt %, the overall mechanical properties of the composite resin composition may become unsatisfactory due to decreased compatibility. And, when the degree of grafting of the silane-based functional group bonded to the polypropylene polymer exceeds 10 wt %, water content may increase and a brittleness problem may occur. The silane-based functional group grafted to the polypropylene polymer may be one or more functional group derived from silane selected from a group consisting of (aminoethylaminopropyl)silane, (3-chloropropyl)triethoxysilane, (phenyl) trimethoxysilane, (vinylbenzylaminoethylaminopropyl)trimethoxysilane, (aminoethylaminopropyl)trimethoxysilane, (methacryloxypropyl)trimethoxysilane and (3-glycidoxypropyl)trimethoxysilane. Specifically, a propylene polymer grafted with about 3-10 wt % (e.g., about 3, 4, 5, 6, 7, 8, 9, or about 10 wt %) of (aminoethylaminopropyl)silane may be used as the surfactant.

The composite resin composition of the present invention may contain 0.1-3 parts by weight (e.g., about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9 or about 3 parts by weight) of the surfactant. When the content of the surfactant included as the compatibilizer is less than 0.1 part by weight, the overall mechanical properties of the composite resin composition may become unsatisfactory due to decreased compatibility. And, when it exceeds 3 parts by weight, rigidity may decrease.

As described above, the composite resin composition of the present invention contains the specific components for ensuring the compatibility and uniform dispersion of the phytoncide as a deodorant and aromatic and preventing the evaporation and pyrolysis of the phytoncide during molding. Specifically, in order to enhance the effect of the present invention, the components except the polypropylene polymer (a) and the olefin-based thermoplastic elastomer (b) may be included in the form of a masterbatch. That is to say, when the inorganic filler having a platy structure (c), the phytoncide (d), the processing oil (e) and the surfactant (f) are included in the composite resin composition of the present invention after being prepared into a pellet-type masterbatch chip, mechanical properties can be further improved due to improved compatibility and dispersibility of the components (c)-(e). Also, the deodorizing capability and aromaticity of the composite resin composition can be continuously maintained for a long time because the movement of the phytoncide toward the surface by the inorganic filler is disturbed. The masterbatch may be prepared by any method recognized by those of ordinary skill in the art. For example, a pellet-type masterbatch chip may be prepared by mixing the components (c)-(e) with the polypropylene polymer used as the base resin in the present invention and performing extrusion molding.

An article molded from the composite resin composition described above can maintain deodorizing capability and aromaticity for 30 days or longer (e.g., 30 days, 35, 40, 45, 50, 55, 60, 65, 70, 75, 80, 85, 90, 95, 100 days, or more) at 80° C. Accordingly, the composite resin composition provided by the present invention is useful as a material for an automotive interior part. An automotive interior part molded from the composite resin composition of the present invention can remove an offensive odor from volatile organic compounds (VOCs), etc. and provide a pleasant environment for drivers due to the unique scent of the phytoncide.

EXAMPLES

Hereinafter, the present invention is described in more detail through examples. The following examples are for illustrative purposes only and the scope of the present invention is not limited by the examples.

Examples

The components used in the following preparation example, examples and comparative examples are as follows.

Polypropylene polymer: A high-crystalline polypropylene polymer (HCPP) for injection molding with a melt flow index of 30 g/10 min (@ 230° C., 2.16 kg) was used.

Thermoplastic elastomer: An ethylene-octene copolymer rubber was used.

Surface-treated platy talc: A platy talc (lamellarity index=10) surface-treated with an alkoxysilane was used.

Phytoncide: A phytoncide microcapsule was used.

Processing oil: A paraffin-based processing oil was used.

Surfactant: A propylene polymer grafted with 7 wt % of an (aminoethylaminopropyl)silane functional group was used.

Preparation Example. Preparation of Masterbatch (MB)

A pellet-type masterbatch (MB) was prepared by physically mixing the components described in Table 1 or Table 2 and performing extrusion at 180-210° C. using a twin screw extruder with a diameter of 40 mm.

TABLE 1

| Composition of masterbatch (parts by weight) | | | | | | |
|---|---|---|---|---|---|---|
| | MB1 | MB2 | MB3 | MB4 | MB5 | MB6 |
| Polypropylene polymer | 20 | 20 | 20 | 20 | 20 | 20 |
| Platy talc (lamellarity index = 10) | 80 | 80 | — | — | — | — |
| Surface-treated platy talc | — | — | 80 | 80 | 80 | 80 |
| Phytoncide | 12 | 12 | 12 | 20 | 0.5 | 12 |
| Processing oil | — | 6 | 6 | 6 | 6 | 12 |
| Surfactant | — | 6 | 6 | 6 | 6 | 12 |

TABLE 2

| Composition of masterbatch (parts by weight) | | | | | |
|---|---|---|---|---|---|
| | MB7 | MB8 | MB9 | MB10 | MB11 |
| Polypropylene polymer | 20 | 20 | 20 | 20 | 20 |
| Platy talc (lamellarity index = 10) | — | — | — | — | — |
| Surface-treated platy talc | 80 | 80 | 80 | 80 | 80 |
| Phytoncide | 12 | 25 | 0.3 | 12 | 12 |
| Processing oil | 0.5 | 6 | 6 | 15 | 0.3 |
| Surfactant | 5 | 6 | 6 | 15 | 3 |

Example 1. Preparation of Composite Resin Sample Using Masterbatch 65 parts by weight of a polypropylene polymer, 10 parts by weight of a thermoplastic elastomer and 25 parts by weight of the MB1 masterbatch prepared in Preparation Example were physically mixed and prepared into a pellet by performing extrusion at 180-210° C. using a twin screw extruder with a diameter of 40 mm. The prepared pellet was injection molded at 180-210° C. at into a sample for evaluating physical properties.

Example 2. Preparation of Composite Resin Sample Using Masterbatch

A sample for evaluating physical properties was prepared in the same manner as in Example 1 except that 25 parts by weight of the masterbatch MB2 was used instead of the masterbatch MB1.

Example 3. Preparation of Composite Resin Sample Using Masterbatch

A sample for evaluating physical properties was prepared in the same manner as in Example 1 except that 25 parts by weight of the masterbatch MB3 was used instead of the masterbatch MB1.

Example 4. Preparation of Composite Resin Sample Using Masterbatch

A sample for evaluating physical properties was prepared in the same manner as in Example 1 except that 25 parts by weight of the masterbatch MB4 was used instead of the masterbatch MB1.

Example 5. Preparation of Composite Resin Sample Using Masterbatch

A sample for evaluating physical properties was prepared in the same manner as in Example 1 except that 25 parts by weight of the masterbatch MB5 was used instead of the masterbatch MB1.

Example 6. Preparation of Composite Resin Sample Using Masterbatch

A sample for evaluating physical properties was prepared in the same manner as in Example 1 except that 25 parts by weight of the masterbatch MB6 was used instead of the masterbatch MB1.

Example 7. Preparation of Composite Resin Sample Using Masterbatch

A sample for evaluating physical properties was prepared in the same manner as in Example 1 except that 25 parts by weight of the masterbatch MB7 was used instead of the masterbatch MB1.

Example 8. Preparation of Composite Resin Sample Using Masterbatch

A sample for evaluating physical properties was prepared in the same manner as in Example 1 except that 30 parts by weight of the masterbatch MB3 was used instead of the masterbatch MB1.

Example 9. Preparation of Composite Resin Sample Using Masterbatch

A sample for evaluating physical properties was prepared in the same manner as in Example 1 except that 7 parts by weight of the masterbatch MB3 was used instead of the masterbatch MB1.

Comparative Example 1. Preparation of Composite Resin Sample

A sample for evaluating physical properties was prepared in the same manner as in Example 1 except that 70 parts by weight of a polypropylene polymer, 10 parts by weight of a thermoplastic elastomer and 20 parts by weight of platy talc were mixed.

Comparative Example 2. Preparation of Composite Resin Sample

A sample for evaluating physical properties was prepared in the same manner as in Example 1 except that 70 parts by weight of a polypropylene polymer, 10 parts by weight of a thermoplastic elastomer, 20 parts by weight of platy talc and 3 parts by weight of a phytoncide were mixed.

Comparative Example 3. Preparation of Composite Resin Sample

A sample for evaluating physical properties was prepared in the same manner as in Example 1 except that 70 parts by weight of a polypropylene polymer, 10 parts by weight of a thermoplastic elastomer, 20 parts by weight of platy talc, 3 parts by weight of a phytoncide, 1.5 parts by weight of a processing oil and 1.5 parts by weight of a surfactant were mixed.

Comparative Example 4. Preparation of Composite Resin Sample

A sample for evaluating physical properties was prepared in the same manner as in Example 1 except that 70 parts by weight of a polypropylene polymer, 10 parts by weight of a thermoplastic elastomer, 20 parts by weight of surface-treated platy talc, 3 parts by weight of a phytoncide, 1.5 parts by weight of a processing oil and 1.5 parts by weight of a surfactant were mixed.

Comparative Example 5. Preparation of Composite Resin Sample Using Masterbatch A sample for evaluating physical properties was prepared in the same manner as in Example 1 except that 25 parts by weight of the masterbatch MB8 was used instead of the masterbatch MB1.

Comparative Example 6. Preparation of Composite Resin Sample Using Masterbatch A sample for evaluating physical properties was prepared in the same manner as in Example 1 except that 25 parts by weight of the masterbatch MB9 was used instead of the masterbatch MB1.

Comparative Example 7. Preparation of Composite Resin Sample Using Masterbatch A sample for evaluating physical properties was prepared in the same manner as in Example 1 except that 25 parts by weight of the masterbatch MB10 was used instead of the masterbatch MB1.

Comparative Example 8. Preparation of Composite Resin Sample Using Masterbatch A sample for evaluating physical properties was prepared in the same manner as in Example 1 except that 25 parts by weight of the masterbatch MB11 was used instead of the masterbatch MB1.

Comparative Example 9. Preparation of Composite Resin Sample Using Masterbatch A sample for evaluating physical properties was prepared in the same manner as in Example 1 except that 35 parts by weight of the masterbatch MB3 was used instead of the masterbatch MB1.

Comparative Example 10. Preparation of Composite Resin Sample Using Masterbatch A sample for evaluating physical properties was prepared in the same manner as in Example 1 except that 5 parts by weight of the masterbatch MB3 was used instead of the masterbatch MB1.

The composition ratios of the components used to prepare the composite resin samples of the examples and comparative examples are described in Tables 3-5.

TABLE 3

| | | Examples (parts by weight) | | | | | | | | |
|---|---|---|---|---|---|---|---|---|---|---|
| | | 1 | 2 | 3 | 4 | 5 | 6 | 7 | 8 | 9 |
| Polypropylene polymer | | 65 | 65 | 65 | 65 | 65 | 65 | 65 | 60 | 83 |
| Thermoplastic elastomer | | 10 | 10 | 10 | 10 | 10 | 10 | 10 | 10 | 10 |
| Master-batch | Platy talc | 20 | 20 | — | — | — | — | — | — | — |
| | Surface-treated platy talc | — | — | 20 | 20 | 20 | 20 | 20 | 24 | 5.6 |
| | Phytoncide | 3 | 3 | 3 | 5 | 0.125 | 3 | 3 | 3.6 | 0.84 |
| | Processing oil | 1.5 | 1.5 | 1.5 | 1.5 | 1.5 | 3 | 0.125 | 1.8 | 0.42 |
| | Surfactant | 1.5 | 1.5 | 1.5 | 1.5 | 1.5 | 3 | 1.25 | 1.8 | 0.42 |

TABLE 4

| | Comparative Examples (parts by weight) | | | |
|---|---|---|---|---|
| | 1 | 2 | 3 | 4 |
| Polypropylene polymer | 70 | 70 | 70 | 70 |
| Thermoplastic elastomer | 10 | 10 | 10 | 10 |
| Platy talc | 20 | 20 | 20 | — |
| Surface-treated platy talc | — | — | — | 20 |
| Phytoncide | — | 3 | 3 | 3 |
| Processing oil | — | — | 1.5 | 1.5 |
| Surfactant | — | — | 1.5 | 1.5 |

TABLE 5

| | | Comparative Examples (parts by weight) | | | | | |
|---|---|---|---|---|---|---|---|
| | | 5 | 6 | 7 | 8 | 9 | 10 |
| Polypropylene polymer | | 65 | 65 | 65 | 65 | 55 | 85 |
| Thermoplastic elastomer | | 10 | 10 | 10 | 10 | 10 | 10 |
| Master-batch | Surface-treated platy talc | 20 | 20 | 20 | 20 | 28 | 4 |
| | Phytoncide | 6.25 | 0.075 | 3 | 3 | 4.2 | 0.6 |
| | Processing oil | 1.5 | 1.5 | 3.75 | 0.075 | 2.1 | 0.3 |
| | Surfactant | 1.5 | 1.5 | 3.75 | 0.75 | 2.1 | 0.3 |

TEST EXAMPLES

Test Example 1. Evaluation of Physical Properties of Composite Resin Samples

Physical properties were evaluated for each 10 composite resin samples of the examples and comparative examples. Mean values of the measurement results except for the highest and lowest limits are summarized in Table 6 and Table 7.

<Measurement of Physical Properties>

Specific gravity: Specific gravity was measured for the center part of the sample according to ASTM D792.

Tensile strength and elongation: Measurement was made according to ASTM D638 at a loading rate of 50 mm/min. Elongation was determined based on the break point.

Flexural modulus and flexural strength: Measurement was made according to ASTM D790 at a loading rate of 10 mm/min.

Izod impact strength: Measurement was made according to ASTM D256 at room temperature (23° C.) and −10° C. for notched test samples.

Heat distortion temperature: Measurement was made according to ASTM D648 with a load of 4.6 kgf.

TABLE 6

| | | | | | Examples | | | | |
|---|---|---|---|---|---|---|---|---|---|
| | 1 | 2 | 3 | 4 | 5 | 6 | 7 | 8 | 9 |
| Specific gravity (g/cm$^3$) | 1.041 | 1.035 | 1.034 | 1.037 | 1.032 | 1.034 | 1.034 | 1.118 | 0.942 |
| Tensile strength (kg/cm$^2$) | 277 | 276 | 277 | 268 | 278 | 264 | 266 | 278 | 268 |
| Elongation (%) | 96 | 97 | 98 | 82 | 96 | 87 | 88 | 92 | 99 |
| Flexural modulus (kg/cm$^2$) | 28,448 | 28,621 | 28,535 | 28,135 | 28,598 | 27,175 | 27,928 | 29,935 | 21,156 |
| Flexural strength (kg/cm$^2$) | 455 | 453 | 452 | 446 | 454 | 437 | 435 | 471 | 402 |
| Izod impact strength (kJ/m$^2$) Room temperature | 21.2 | 20.5 | 21.6 | 18.1 | 20.8 | 18.2 | 18.1 | 15.3 | 25.1 |
| Izod impact strength (kJ/m$^2$) −10° C. | 3.4 | 3.2 | 3.7 | 3.1 | 3.4 | 3.1 | 3.0 | 3.1 | 5.2 |
| HDT (4.6 kgf, ° C.) | 141.6 | 140.1 | 140.6 | 139.8 | 140.7 | 139.2 | 139.8 | 142.3 | 131.7 |

TABLE 7

| | Comparative Examples | | | | | |
|---|---|---|---|---|---|---|
| | 1 | 2 | 3 | 4 | 5 | 6 |
| Specific gravity (g/cm$^3$) | 1.031 | 1.04 | 1.036 | 1.36 | 1.035 | 1.037 |
| Tensile strength (kg/cm$^2$) | 276 | 258 | 257 | 259 | 257 | 276 |
| Elongation (%) | 111 | 78 | 77 | 78 | 76 | 94 |
| Flexural modulus (kg/cm$^2$) | 28,104 | 26,363 | 25,922 | 26,109 | 26,875 | 28,234 |
| Flexural strength (kg/cm$^2$) | 455 | 448 | 434 | 442 | 434 | 448 |
| Izod impact strength (kJ/m$^2$) Room temp. | 20 | 17.3 | 17.1 | 17.9 | 15.2 | 20.4 |
| Izod impact strength (kJ/m$^2$) −10° C. | 3.7 | 2.6 | 2.6 | 2.8 | 2.4 | 3.4 |
| HDT (4.6 kgf, ° C.) | 140.9 | 139.6 | 138.2 | 139.4 | 138.8 | 139.8 |

| | Comparative Examples | | | |
|---|---|---|---|---|
| | 7 | 8 | 9 | 10 |
| Specific gravity (g/cm$^3$) | 1.035 | 1.034 | 1.191 | 0.938 |
| Tensile strength (kg/cm$^2$) | 258 | 260 | 281 | 266 |
| Elongation (%) | 77 | 81 | 88 | 98 |
| Flexural modulus (kg/cm$^2$) | 25,789 | 26,954 | 31,035 | 20,023 |
| Flexural strength (kg/cm$^2$) | 421 | 422 | 488 | 389 |
| Izod impact strength (kJ/m$^2$) Room temp. | 15.8 | 17.1 | 12.2 | 26.8 |
| Izod impact strength (kJ/m$^2$) −10° C. | 2.4 | 2.5 | 2.1 | 5.5 |
| HDT (4.6 kgf, ° C.) | 137.5 | 138.7 | 145.3 | 130.2 |

From Table 6 and Table 7, it can be seen that, when compared with the composite resin sample consisting of the polypropylene polymer, the thermoplastic elastomer and the platy talc only (Comparative Example 1), the composite resin samples of Comparative Examples 2-4 show significant degradation of mechanical properties due to the presence of the additives such as the phytoncide, etc. In contrast, the composite resin samples of Examples 1-9 show minimized degradation of mechanical properties because the additives such as the phytoncide, etc. are included in the form of a masterbatch.

In addition, the composite resin samples of Examples 1-9, wherein the composition ratios of the inorganic filler having a platy structure (c), the phytoncide (d), the processing oil (e) and the surfactant (f) constituting the masterbatch are specifically limited, show superior mechanical properties. However, the composite resin samples of Comparative Examples 5-10, wherein the composition ratios of the components constituting the masterbatch fall outside the proper range, show significant degradation of mechanical properties as compared to those of Examples 1-9.

Test Example 2. Sensory Evaluation of Odor

Sensory evaluation of odor was conducted for the composite resin samples of the examples and comparative examples. The samples were provided to a panel of 20 ordinary people. The panels were asked to score from −5 points for the offensive odor due to volatile organic compounds, etc. to 5 points for the scent of the phytoncide. The samples were stored under a harsh condition of 80° C. and the sensory evaluation was performed 24 hours, 7 days, 15 days and 30 days after the preparation of the samples. The result of the sensory evaluation is shown in Table 8.

TABLE 8

|  | Examples | | | Comparative Examples | | | |
| --- | --- | --- | --- | --- | --- | --- | --- |
|  | 1 | 2 | 3 | 1 | 2 | 3 | 4 |
| 24 hours later | 3.8 | 4.2 | 4.6 | −3.2 | 3.4 | 3.9 | 4.1 |
| 7 days later | 3.4 | 3.9 | 4.4 | −1.5 | 2.5 | 2.7 | 3.0 |
| 15 days later | 2.8 | 3.4 | 4.1 | −1.1 | 1.3 | 1.8 | 2.2 |
| 30 days later | 2.5 | 3.0 | 3.4 | 0.4 | 0.8 | 0.8 | 1.0 |

From Table 8, it can be seen that the composite resin samples of Examples 1-3 and Comparative Examples 2-4 containing the phytoncide show superior results when compared with the composite resin sample not containing the phytoncide (Comparative Example 1). In particular, the composite resin samples of Examples 1-3, wherein the additives such as the phytoncide, etc. are included in the form of a masterbatch, show superior results when compared with the samples of Comparative Examples 2-4, wherein the additives such as the phytoncide, etc. are included without the form of a masterbatch, and this effect becomes more remarkable with time. It is because the masterbatch induces uniform dispersion of the phytoncide by improving compatibility between the phytoncide and the organic resin or the additives and disturbs the movement of the phytoncide to the surface by the platy inorganic filler.

Also, the composite resin samples of Examples 1-3 and Comparative Examples 3-4 containing the processing oil and the surfactant show superior results when compared with the composite resin sample not containing the processing oil and the surfactant (Comparative Example 1). This is because the processing oil and the surfactant improves compatibility with the phytoncide and prevents the pyrolysis of the phytoncide.

In addition, the composite resin samples containing the platy inorganic filler surface-treated with an organosilane (Example 3 and Comparative Example 4) show superior results when compared with the composite resin samples containing the non-surface-treated platy inorganic filler (Examples 1-2 and Comparative Examples 2-3). This is because the phytoncide is easily impregnated into the composite resin sample and retained for a long time in the composite resin sample due to the affinity between the functional group of the surface-treated platy inorganic filler and the phytoncide.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A polypropylene composite resin composition with continuously maintained deodorizing capability and aromaticity comprising:
   (a) 40-90 parts by weight of a polypropylene polymer;
   (b) 5-25 parts by weight of an olefin-based thermoplastic elastomer;
   (c) 5-25 parts by weight of a platy inorganic filler;
   (d) 0.1-5 parts by weight of a phytoncide;
   (e) 0.1-3 parts by weight of a processing oil; and
   (f) 0.1-3 parts by weight of a surfactant,
   wherein the platy inorganic filler (c), the phytoncide (d), the processing oil (e) and the surfactant (f) are included in the form of a masterbatch.

2. The polypropylene composite resin composition of claim 1, wherein the polypropylene polymer (a) has a melt flow index of 5-50 g/10 min (@230° C., 2.16 kg).

3. The polypropylene composite resin composition of claim 1, wherein the olefin-based thermoplastic elastomer (b) is one or more selected from a group consisting of an olefin homopolymer rubber, an olefin copolymer rubber, and an olefin block copolymer rubber.

4. The polypropylene composite resin composition of claim 1, wherein the platy inorganic filler (c) is a platy inorganic filler surface-treated with an organosilane.

5. The polypropylene composite resin composition of claim 4, wherein the platy inorganic filler (c) is a platy inorganic filler surface-treated with an organosilane substituted with a hydrolyzable organic functional group selected from a group consisting of an epoxide group, an isocyanate group, an organic acid group, an acrylic acid group, an alcohol group, an alkoxy group, and an acyl chloride group.

6. The polypropylene composite resin composition of claim 1, wherein the platy inorganic filler (c) is a platy inorganic filler surface-treated with an alkoxysilane.

7. The polypropylene composite resin composition of claim 1, wherein the platy inorganic filler (c) is one or more selected from a group consisting of talc, mica, and platy magnesium (Mg), and has a lamellarity index of 5-15.

8. The polypropylene composite resin composition of claim 1, wherein the phytoncide (d) comprises one or more selected from a group consisting of α-pinene, β-pinene, camphene, α-terpinene, β-terpinene, γ-terpinene, β-phellandrene, 1,8-cineole, α-terpinolene, and δ-cadinene as an active ingredient.

9. The polypropylene composite resin composition of claim 1, wherein the processing oil (e) comprises one or more selected from a group consisting of an aromatic oil, a naphthenic oil, and a paraffinic oil.

10. The polypropylene composite resin composition of claim 1, wherein the surfactant (f) is a propylene polymer grafted with 3-10 wt % of a silane-based functional group.

11. The polypropylene composite resin composition of claim 1, wherein the composition maintains deodorizing capability and aromaticity for 30 days or longer at 80° C.

12. An automotive interior part molded by including the polypropylene composite resin composition of claim 1.

* * * * *